J. I. LEE.
POULTRY FEEDING APPLIANCE.
APPLICATION FILED FEB. 9, 1911.
1,023,945.
Patented Apr. 23, 1912.
2 SHEETS—SHEET 1.
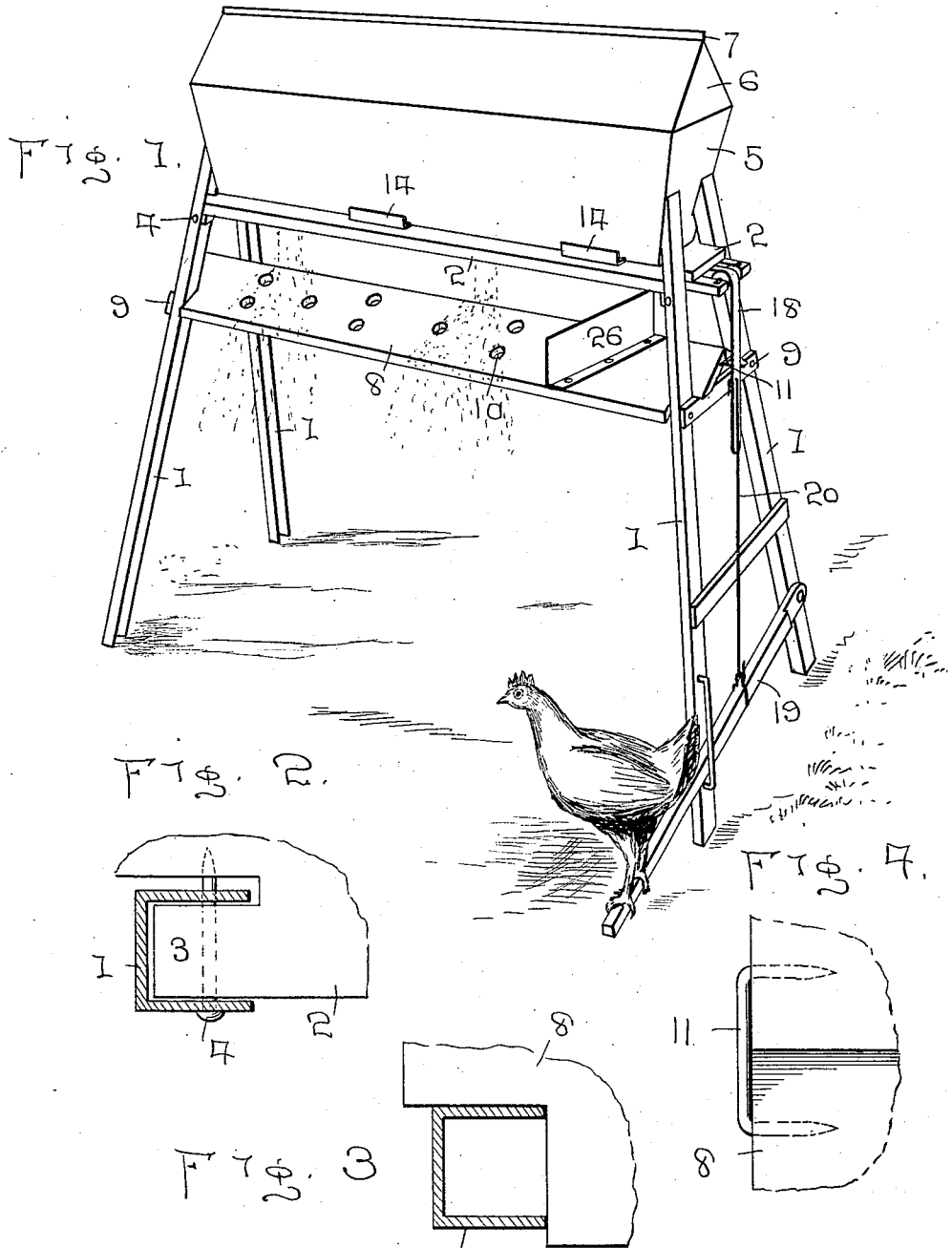
WITNESSES:
INVENTOR
J. I. Lee
BY
W. J. Fitzgerald & Co.
Attorneys J. I. LEE.
POULTRY FEEDING APPLIANCE.
APPLICATION FILED FEB. 9, 1911.
1,023,945.
Patented Apr. 23, 1912.
2 SHEETS—SHEET 2.
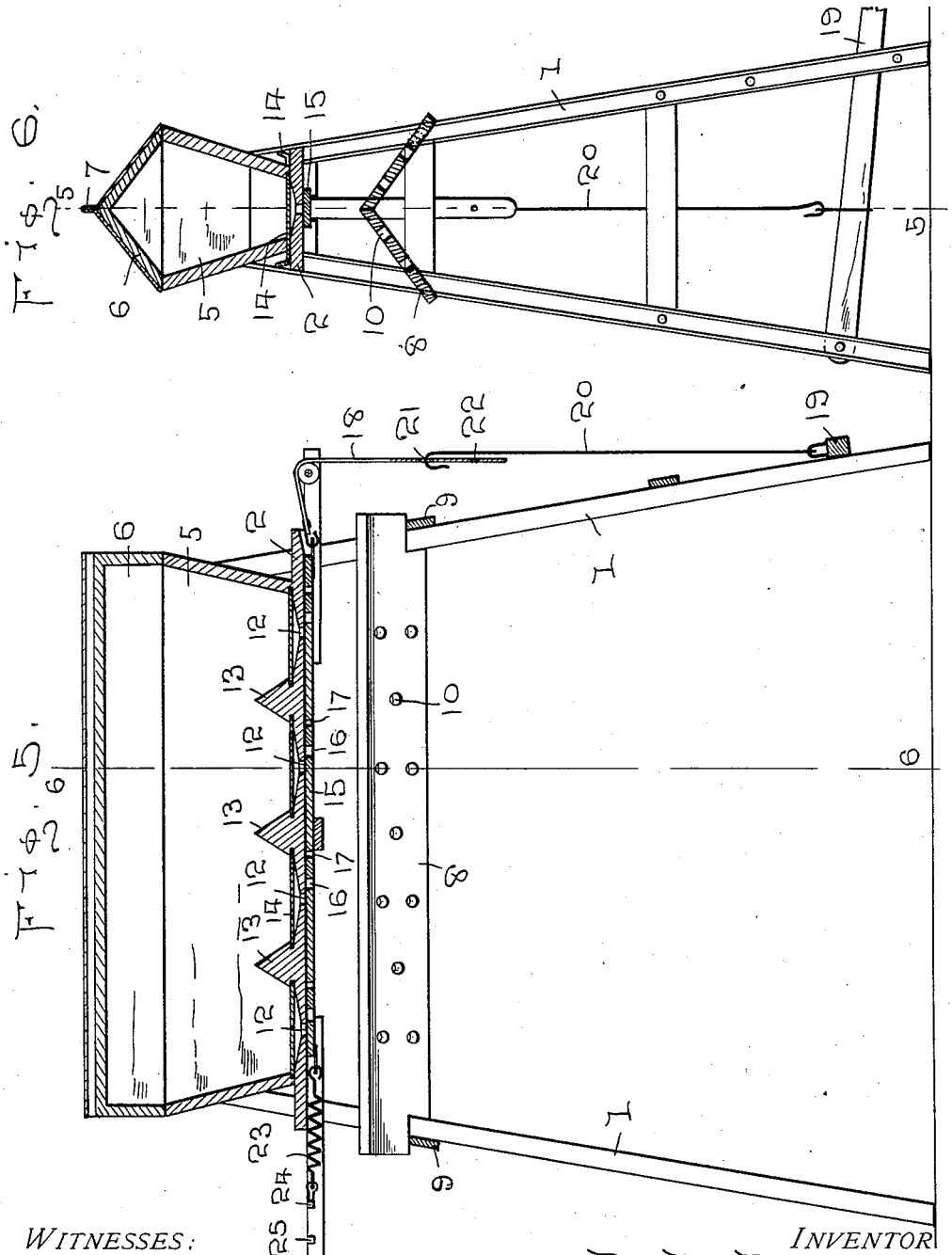

UNITED STATES PATENT OFFICE.

JOHN I. LEE, OF HUNTERSVILLE, WEST VIRGINIA.

POULTRY-FEEDING APPLIANCE.

1,023,945.  Specification of Letters Patent.  Patented Apr. 23, 1912.

Application filed February 9, 1911. Serial No. 607,683.

*To all whom it may concern:*

Be it known that I, JOHN I. LEE, a citizen of the United States, residing at Huntersville, in the county of Pocahontas and State of West Virginia, have invented certain new and useful Improvements in Poultry-Feeding Appliances; and I do hereby declare the following to be a full, clear, and exact description of the invention, such as will enable others skilled in the art to which it appertains to make and use the same.

My invention relates to a poultry feeding appliance and more particularly to that variety of feeding appliances which will enable the poultry to readily learn to provide for themselves the desired quantity of food without the necessity of the attendant giving any attention thereto whatever.

The object, therefore, of my invention is to provide a feeding appliance for poultry and particularly for chickens, having means which will insure the reliably efficient operation thereof simply by the addition of the weight of the fowl, as will be incident to the jumping upon and off from a controlling or operating lever.

Other objects and advantages will be hereinafter made clearly apparent, reference being had to the accompanying drawings which are made a part of this application and in which, Figure 1 shows a perspective view of my invention complete. Figs. 2, 3 and 4 show certain details of preferred construction of certain parts. Fig. 5 is a longitudinally sectional view of my feeding appliance taken on the line 5—5 of Fig. 6, and Fig. 6 is a transverse section of my feeding appliance taken substantially on line 6—6, of Fig. 5.

For convenience of reference to the various details of my invention and coöperating parts, numerals will be employed, the same numerals corresponding to the corresponding parts in the several views.

Referring in detail to the drawings, 1 indicates suitable supporting legs which may be made of any preferred construction and material, though I preferably employ sheet metal for the purpose, properly bent upon itself, as indicated in Fig. 2 of the drawings, whereby the base plate or bottom 2 may be properly shaped or provided with an extension 3 to fit within the angular recess formed by the supporting legs 1. The base plate 2, and said legs are permanently united together in any desired manner, but preferably by means of the nail or screw 4. The base member or plate 2 has attached to its upper side, the receptacle 5 which is provided with a suitable lid or closure 6 and said parts may be constructed of wood or sheet metal, as preferred.

A suitable ridge plate 7 should be provided for the top portion of the lid section which will prevent fowls from roosting thereon, though other means may be employed to accomplish this result.

In order to hold the supporting legs in an extended position, I provide what I designate as a scattering board 8, so shaped at each end that it will fit around each of the leg sections, the upper ends of the leg sections engaging the ends of the box, while the end thereof will rest upon a supporting cleat or brace 9 and it will not be necessary, therefore, to permanently secure the scattering board in its position, inasmuch as when once placed in its operative position, it will be reliably held therein against casual displacement, though it may be quickly removed when it is desired to pack the feeding appliance for shipment.

The scattering board is composed of two members having their edges beveled to fit closely together, as indicated in Fig. 6, whereby when the grain is released from the receptacle 5, it will fall upon the scattering board and be deflected outward thereby, excepting that portion of the grain which may have passed through the apertures 10 in said scattering board. Said scattering board members are hinged together or pivotally secured together preferably by means of the connecting member 11, as shown in Fig. 4, which will permit the said members to be folded toward each other at the lower edges, as will be necessary when introducing the same in its operative position in coöperation with the supporting legs 1.

The base plate or member 2 is provided at suitable intervals with apertures 12 and also with transversely disposed partition walls 13, the latter being preferably so formed as to direct the contents of the box toward the openings 12. The transverse partition walls 13, therefore, separate the receptacle into a series of compartments and in order to make it possible to use any or all of said compartments and apertures 12 formed thereon, I provide the sliding closures or cut-offs 14, which extend outward through the walls of the box 5 where they are readily accessible for manual controlling, making it possible to close any or all of said openings 12, as would be clearly apparent.

Beneath the base or plate 2, I mount in any preferred way, the longitudinally movable grain releasing bar 15, which is also provided with apertures 16 and 17 formed of different size and it is obvious that as the apertures 16 are of greater size than the apertures 17, a greater or less quantity of grain may be readily discharged from the receptacle by a proper adjustment and control of the bar 15. The said bar 15 may be controlled in a variety of ways, as by the strap member 18 operatively connected to the controlling lever 19, as by the rod or wire section 20.

In Fig. 5, I have shown the operating mechanism for the bar 15 as properly connected to bring the apertures 16 and 12 into registration with each other so that a larger quantity of grain will be released. This result, I accomplish by attaching the end of the rod 20 into an aperture 21 in the strap 18, but where it is desired to bring the apertures 12 and 17 into coöperation with each other, I release the hook end of the bar 20 from the aperture 21 and enter it in the aperture 22 of said strap 18 and I also release the end of the spring 23 from the notch 24 and place it in the notch or recess 25. The tension of the spring will then cause the bar 15 to move longitudinally a sufficient distance to bring the smaller apertures 17 normally to the left of the apertures 12, and a pressure upon the free end of the lever 19 will overcome the tension of the spring 23 and draw the releasing bar 15 to the right, incidentally bringing the apertures 12 and 17 into registration and permitting a small quantity of grain to be released which will fall down upon the scattering board 8, as will be obvious.

When the pressure upon the controlling lever 19 is removed, as when the fowl jumps therefrom, the tension of the spring 23 will restore the releasing bar 15 to its normal position and incidentally cause the said apertures 12 and 17 to momentarily be brought into registration with each other and consequently releasing a further quantity of the grain within the receptacle 5. It will therefore be observed that two operations of releasing the grain are accomplished by the simple act of a fowl jumping upon the controlling lever 19 and springing therefrom.

By reference to Fig. 5, it will be seen that the apertures 12 and 16 have just been brought into registration with each other and the bar 15 is therefore held against the action of the spring 23, but when the weight upon the lever is removed, said spring will restore the bar 15 to its initial position and will momentarily bring apertures 12 and 16 into registration.

By the means which I have employed, it is obvious that all of the apertures 12 may be left open or closed, as preferred, and that the full capacity of my machine may be utilized or only a portion thereof, as deemed most desirable.

It is found in practice that the fowls will soon learn to utilize the means thus placed at their disposal for feeding themselves and they will thus be actively engaged throughout the day in releasing a smaller or larger quantity of grain, according to the adjustment of the machine and it, therefore, follows that my self-acting feeding appliance for fowls will serve as a valuable exerciser and will tend to keep fowls in that healthy, active condition so desirable and important for laying fowls.

In the drawings, I have shown a deflecting plate 26, which may or may not be used, as desired, the object of the plate being to deflect the grain and prevent it from falling near the controlling lever which might tend to cause the fowl to become unduly congregated at this point.

Believing that the advantages and manner of constructing and using my self-acting feeding appliance for chickens and the like, have thus been made clearly apparent, further description is deemed unnecessary.

What I claim and desire to secure by Letters Patent is:—

The herein described self-acting feeding appliance for fowls, comprising a receptacle for the feed, suitable supporting legs therefor, a base plate supporting the feeding receptacle and having a plurality of apertures and closures therefor, deflecting partitions formed integral with said base plate, a coöperating movable releasing bar having graduated apertures therein to be brought into coöperation with the apertures in said plate, an apertured scattering board beneath said receptacle, a deflecting plate secured to the top of said scattering board, a spring for controlling said releasing bar, means for adjusting said spring, and operating means comprising a lever adapted to respond readily to the weight of the fowl when placed thereon and removed, said controlling means being adapted to restore itself to the initial position at each operation.

In testimony whereof I have signed my name to this specification in the presence of two subscribing witnesses.

JOHN I. LEE.

Witnesses:
W. E. WRIGHT,
W. T. FITZ GERALD.